United States Patent
Böh et al.

(10) Patent No.: US 7,444,118 B2
(45) Date of Patent: Oct. 28, 2008

(54) ELECTRONIC COMMUNICATIONS SYSTEM

(75) Inventors: Frank Böh, Buchholz (DE); Jürgen Nowottnick, Hamburg (DE)

(73) Assignee: NXP B.V., Eindhoven (NL)

( * ) Notice: Subject to any disclaimer, the term of this patent is extended or adjusted under 35 U.S.C. 154(b) by 541 days.

(21) Appl. No.: 10/554,733

(22) PCT Filed: Apr. 20, 2004

(86) PCT No.: PCT/IB2004/050470

§ 371 (c)(1),
(2), (4) Date: Oct. 28, 2005

(87) PCT Pub. No.: WO2004/096616

PCT Pub. Date: Nov. 11, 2004

(65) Prior Publication Data

US 2007/0142088 A1    Jun. 21, 2007

(30) Foreign Application Priority Data

Apr. 29, 2003  (EP)  .................................. 03101190

(51) Int. Cl.
*H04B 7/00*  (2006.01)
*H04B 1/18*  (2006.01)

(52) U.S. Cl. ........................ 455/39; 455/41.1; 455/41.2; 455/193.1; 340/10.1; 340/10.3; 340/10.4; 340/505

(58) Field of Classification Search ....... 455/41.1–41.3, 455/193.1, 193.2, 343.1–343.3; 340/10.1, 340/10.3, 10.4, 505

See application file for complete search history.

(56) References Cited

U.S. PATENT DOCUMENTS 5,804,888 A * 9/1998 Murr et al. ................ 307/10.2

(Continued)

FOREIGN PATENT DOCUMENTS

EP    0 901 664    3/1999

*Primary Examiner*—Simon Nguyen
(74) *Attorney, Agent, or Firm*—Peter Zawilski

(57) ABSTRACT

In order that an electronic communications system (100) equipped with: [a.1] at least one base station (10), to which [a.2] at least one LC resonant circuit (13, 16) [a.2.1] with at least one antenna unit (16) in the form of a coil, and [a.2.2] at least one capacitive unit (13) series-connected to the antenna unit (16) is assigned, which base station (10) is arranged, in particular, on an object to be secured against unauthorized use and/or against unauthorized access, such as on a means of locomotion, on an access system or on an entry system, and [b.1] at least one transponder station (40), to which [b.2] at least one antenna unit (44) in the form of a coil is assigned, which transponder station (40) can be carried by, in particular, an authorized user and/or is designed for the exchanging of data signals (22, 24) with the base station (10), wherein the utilization and/or access entitlement is determined and/or the base station (10) can be controlled accordingly by means of these data signals (22, 24), may be further developed in such a way that it can be relied upon that a detuning of the resonant frequency of the LC resonant circuit (13, 16) no longer occurs, it is proposed that the resonant frequency of the LC resonant circuit (13, 16) is set to a predetermined desired value, and/or calibrated, by means of at least one tuning circuit (17, 18) connected in parallel with the antenna unit (16) and/or in parallel with the capacitive unit (13).

12 Claims, 3 Drawing Sheets

U.S. PATENT DOCUMENTS

| | | | |
|---|---|---|---|
| 5,842,118 A * | 11/1998 | Wood, Jr. | 455/101 |
| 6,650,227 B1 * | 11/2003 | Bradin | 340/10.3 |
| 6,703,920 B2 * | 3/2004 | Zimmer | 340/10.34 |
| 6,731,198 B1 * | 5/2004 | Stobbe et al. | 340/10.33 |
| 6,824,054 B2 * | 11/2004 | Christoffers et al. | 235/451 |
| 2003/0104848 A1 * | 6/2003 | Brideglall | 455/574 |
| 2005/0024198 A1 * | 2/2005 | Ward, Jr. | 340/505 |

* cited by examiner

ELECTRONIC COMMUNICATIONS SYSTEM

The present invention relates generally to the technical field of security systems, including, in particular, electronic immobilizer systems, as used in, for example, the field of means of locomotion, in particular in the field of motor vehicles.

In particular, the present invention relates to an electronic communications system as claimed in the pre-characterizing part of claim 1, and to a method of operating at least one electronic communications system of this kind as claimed in the pre-characterizing part of claim 7.

In order to realize communications systems of the kind mentioned above, which are equipped inter alia with, for example, a conventional passive transponder system, various system configurations are conventionally in use. One possible configuration for realizing a security system of the kind mentioned above is shown in FIG. 1 of the drawings with reference to the example of an electronic immobilizer system for a motor vehicle:

A so-called base station 10 with an associated antenna unit 16, taking the form of a coil (=component of an LC resonant circuit 13, 16), firstly supplies a transponder station 40 inductively with power 20, i.e. the transponder station 40 is supplied via an inductive field; secondly, a communication sequence for authentication purposes takes place between the base station 10 and the transponder station 40 (→ a well-known transponder system with an inductive channel carrier frequency of, for example, 125 kHz):

In detail, there exist as signal transmission connections between the base station 10 and the transponder station 40 a so-called up-link frame 22, which takes the form of, for example, at least one LF (Low Frequency) channel with inductive coupling and is transmitted via the signals from the base station 10 to the transponder station 40, and a so-called down-link frame 24, which takes the form of, for example, at least one LF channel and is transmitted via the signals from the transponder station 40 to the base station 10.

With reference to the typical configuration of an electronic communications system 100, as shown in FIG. 1, it should be borne in mind that the LC resonant circuit 13, 16 operated by the base station 10 is generally activated with a relatively accurate clock (←→ quartz or ceramic resonator reference), for example with a carrier frequency of 125 kHz, in FIG. 1 via the output terminal of the base station 10 assigned to the intermediate resistor 15, and via the output terminal of the base station 10 assigned to the capacitive element 13.

As a result of the tolerances of the components 13 and 16 of the LC resonant circuit 13, 16, and of temperature effects and/or of aging processes, a relatively imprecise resonant frequency of the LC resonant circuit 13, 16 arises. This detuning of the LC resonant circuit 13, 16 in turn leads to a reduction in the range of the power 20 of the transponder system, and also causes the conditions during transmission of the data 22, 24 to become less favorable, especially during the demodulation; the modulation is affected by the imprecise resonant frequency of the LC resonant circuit 13, 16.

In addition, there are base stations 10 that derive the system clock for supplying the digital function groups of the base station 10 (and, where applicable, any further connected components) from the resonant frequency of the LC resonant circuit 13, 16. Here, the tolerances of the resonant frequency lead to an imprecise system clock; an imprecise system clock can, in turn, lead to a large number of timing problems.

In view of the fact that it is precisely in the automotive field or the access field, for example, that more stringent requirements are today being placed on the function, the security and the reliability of particular components, then, considering the impairments in communication between the individual components, and considering also the reduced range of the electronic communications system, the configuration as shown in FIG. 1 appears to be no longer appropriate to the times.

Starting from the basis of the above-mentioned disadvantages and inaccessibilities, and acknowledging the prior art outlined, it is an object of the present invention to further develop an electronic communications system and a method of the kind mentioned above in such a way that it can be relied upon that the detuning of the resonant frequency of the LC resonant circuit no longer occurs.

This object is achieved by an electronic communications system with the features as claimed in claim 1, and by a method with the features as claimed in claim 7. Advantageous embodiments and expedient further embodiments of the present invention are identified in the respective dependent claims.

The teaching of the present invention therefore rests on the setting of the resonant frequency of at least one LC resonant circuit with the aid of an RC combination or with the aid of an RL combination, which is connected in parallel with the resonant capacitor or in parallel with the resonant coil of the LC resonant circuit, wherein the value of the resistor R of the RC combination or the RL combination is continuously adjustable in accordance with the invention.

Calibration of the resonant frequency of the LC resonant circuit takes place by means of the control of the resistance value of the RC combination or the RL combination in accordance with at least one control method. In accordance with a preferred embodiment of the present invention, any control algorithm whatever may, in principle, be used here in order to realize the controlled calibration of the LC oscillator. In respect of the present invention, the expert in the field of communication electronics, for example an electrical engineer with extensive knowledge in the field of security systems, will particularly appreciate that a significant reduction in system costs can advantageously be achieved, since the number of quartz oscillators or ceramic oscillators required can be reduced, in accordance with the invention, to one single quartz oscillator or one single ceramic oscillator, in order to generate the reference frequency.

A further significant advantage is the compensation of temperature drift and/or the compensation of aging effects of the resonant frequency as a result of the use of the present invention in a sensor-supported control circuit. In addition, optimum conditions are created by the present invention for the transmission of power and data in transponder systems.

A further advantage of the present invention consists in the reduction of the terminals (known as pins) necessary for an external quartz on the base station through complete integration of the clock generator (←→ smaller, more cost-effective housing). In addition to the additional, simple facility for adjusting the frequency (known as frequency modulation), which is, to some extent, a byproduct of the present invention, a significant increase in system security resulting from the elimination of the risk of non-excitement of (further) quartz oscillators or of (further) ceramic oscillators can, advantageously, be cited in accordance with the invention.

In accordance with one expedient embodiment of the present method, the most recently used calibration value may be used as the optimum starting value for the subsequent recalibration; following each calibration undertaken, it may be stored permanently in or by the microcontroller, for example in at least one EEPROM (Electrical Erasable Programmable Read Only Memory), i.e. in at least one memory component in microprocessor systems the contents of which can be varied and wherein the data remains even after the system has been switched off.

In a further embodiment that is essential for the invention, additional interference-immunity can be achieved through the addition of plausibility checks. The measured frequencies or measured phases are then compared between the individual calibration steps. The measurements may have been so corrupted by signal interference that the values lie outside possible value ranges. In such cases, the calibration is expediently started again.

In accordance with an advantageous embodiment of the present invention, the clock supply of the digital function groups may be realized by at least one freely resonating oscillator, which is fed from the LC resonant circuit; in turn, this LC resonant circuit is calibrated by means of the present method. In this context, at least one clock multiplier circuit, which generates higher clock frequencies for supplying the digital function groups, e.g. in the form of clock generation from the edges of the input signal, may, advantageously, be used.

The present invention, which also extends to:
at least one base unit of the kind explained above,
at least one transponder station of the kind explained above,
a control method for setting and/or for calibrating the resonant frequency of at least one LC resonant circuit, which is assigned to at least one electronic communications system of the kind explained above, in particular to at least one base unit of the kind explained above, may be used in an advantageous manner in transponder systems that are used to a great extent in the area of immobilizer systems for means of locomotion, in particular for motor vehicles.

One further application area for the present invention lies in the area of building security, since the electronic communications system, both with its base station and with its transponder station, is also suited, in an advantageous manner, for realizing secure access systems or secure entry systems based on transponders.

Accordingly, the base station may, in particular, be arranged on an object to be secured against unauthorized use and/or against unauthorized access, such as on a means of locomotion, on an access system or on an entry system.

In this context, the present invention is generally used in systems where the accuracy and stability of the resonant frequency of an LC resonant circuit used are important. The application range of the present invention accordingly comprises a large number of the most diverse applications equipped with corresponding LC resonant circuits. Already mentioned as one embodiment example was the electronic immobilizer system for motor vehicles, which generally comprises a base station, which, in turn, activates an LC resonant circuit. The base station is typically controlled by a microcontroller, which is connected to the base station via a data line.

The accuracy and stability of the resonant frequency of the LC resonant circuit are of importance inter alia when the precise clock supply of the base station (and, where applicable, the precise clock supply of the connected microcontroller also) are to be derived from the LC resonant frequency, e.g. with the aid of a freely resonating oscillator.

In addition, the accuracy and stability of the resonant frequency of the LC resonant circuit also play an important role to the extent that an optimum power transmission exists only when the resonant frequency coincides as accurately as possible with the carrier frequency of the passive transponder system, e.g. 125 kHz, under all conditions, such as temperature, aging or similar.

Typical application areas for the present invention are passive transponder systems in industrial applications or in the automotive field. Many further application areas operating with precise LC circuits, such as filters, in particular LC filters, or sensor interface electronics, are possible.

Further designs, features and advantages of the present invention will be shown and explained in detail with reference to the FIGS. 2 and 3 below.

Embodiments, elements or features that are identical or similar are provided with identical reference numbers in FIGS. 1 to 3.

Figure 1:
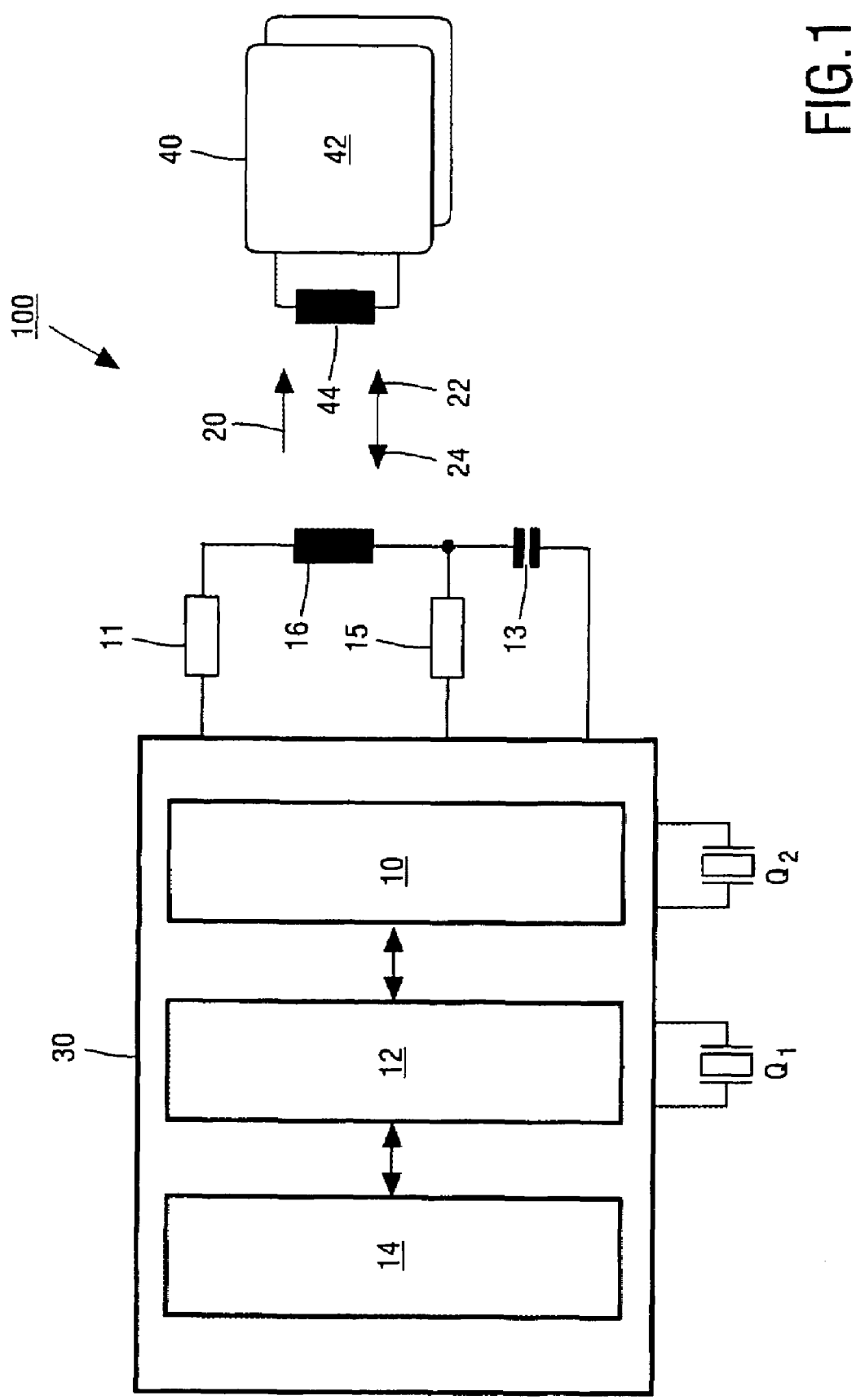
FIG. 1 shows a schematic circuit diagram of the communications principle, based on inductive coupling, between a base station and an associated transponder station in accordance with one embodiment from the prior art.
Figure 2:
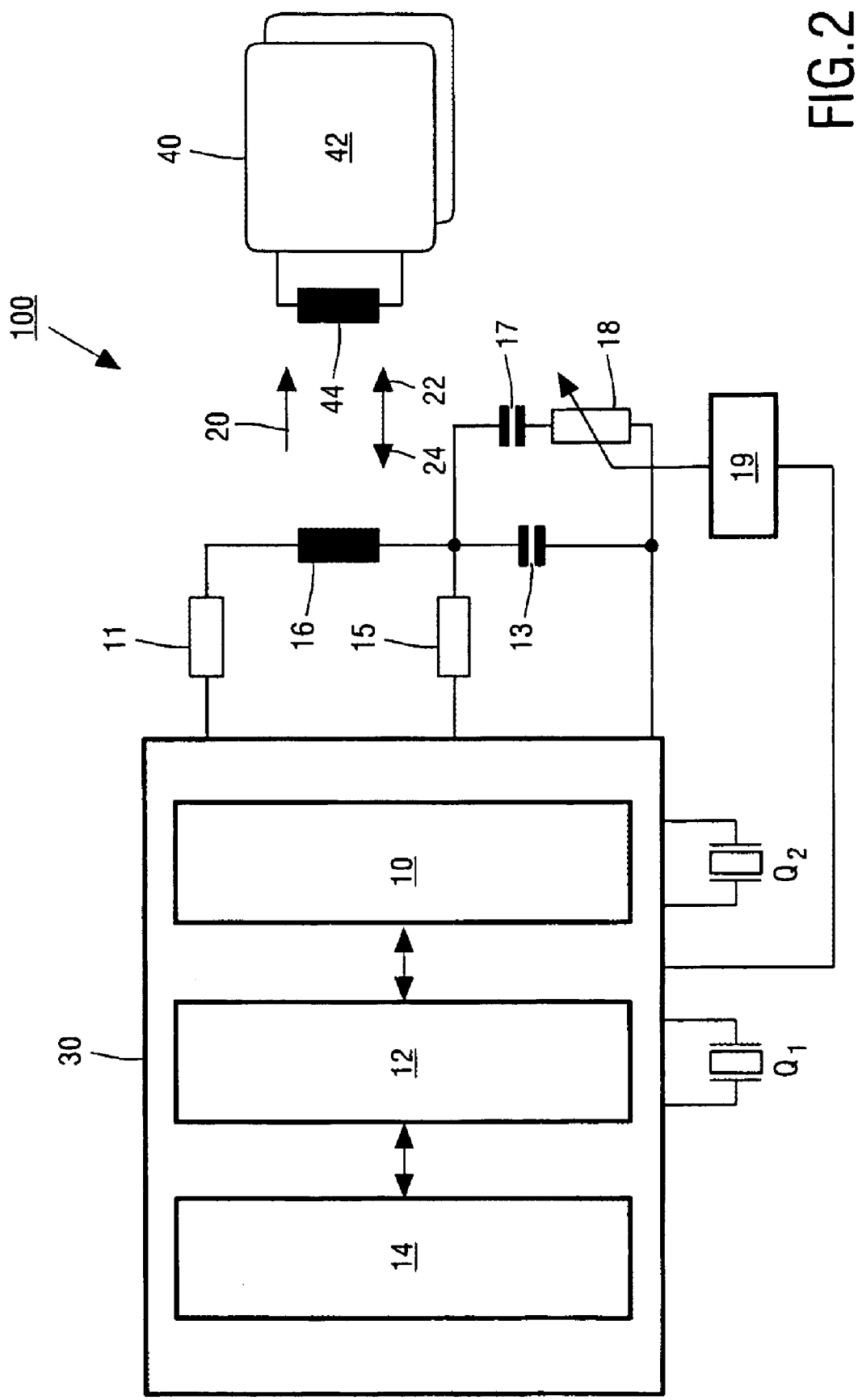
FIG. 2 shows a schematic circuit diagram of the communications principle, based on inductive coupling, between a base station and an associated transponder station in accordance with a first embodiment of the present invention.
Figure 3:
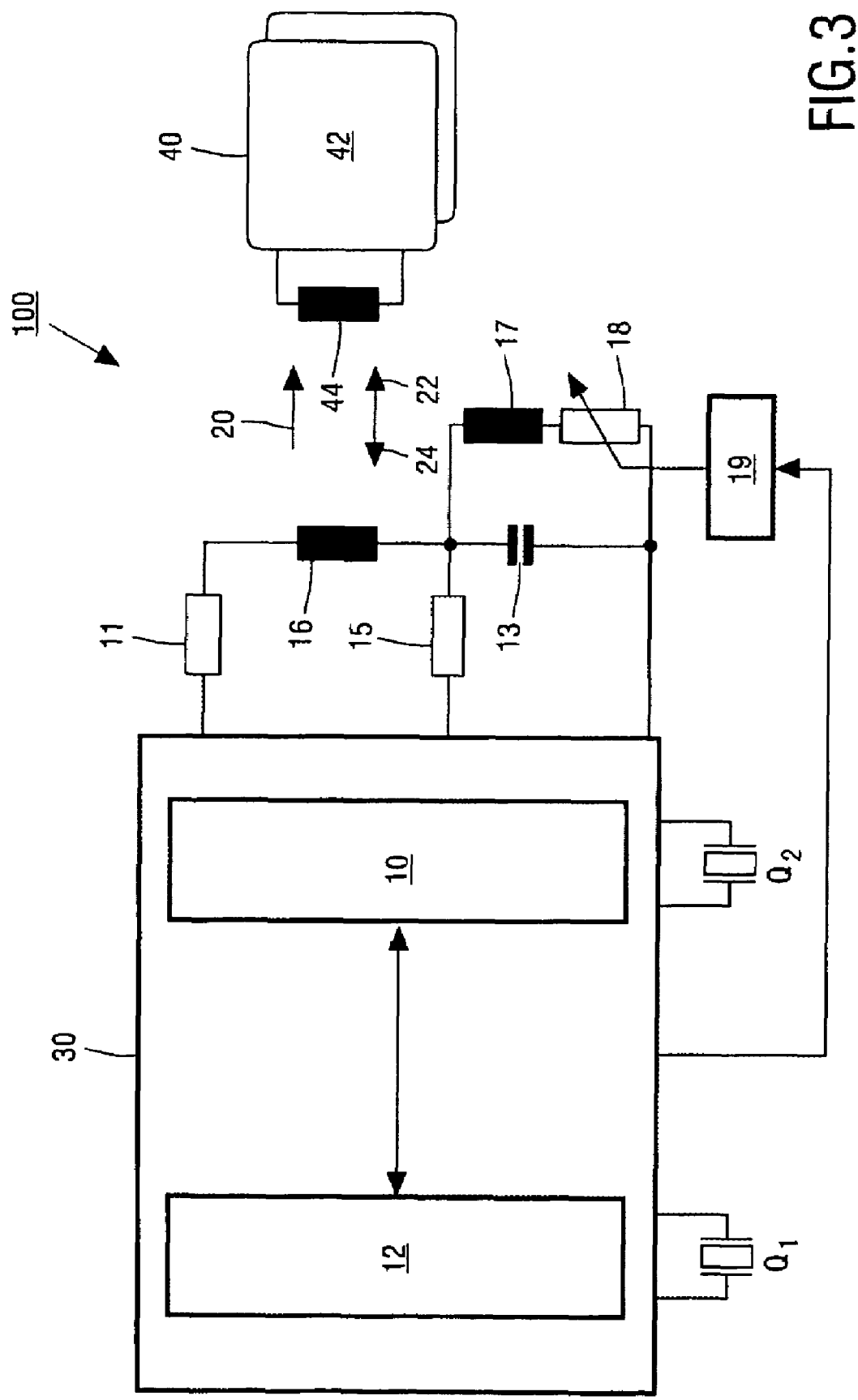
FIG. 3 shows a schematic circuit diagram of the communications principle, based on inductive coupling, between a base station and an associated transponder station in accordance with a second embodiment of the present invention.

As shown in FIGS. 2 and 3 with reference to two embodiments, an electronic communications system 100 equipped inter alia with a transponder system (←→ transponder station 40) that is in turn part of a security system in the form of an electronic immobilizer system for a motor vehicle, is realized by the present invention.

The transponder station itself, 40, can be carried by the authorized user of the motor vehicle; to this end, the transponder station 40 may be accommodated in, for example, the web of the key belonging to the vehicle's ignition lock.

Also shown in FIGS. 2 and 3 is a base unit 30 with base station 10, which, in a manner essential for the invention, takes the form of a transponder communications device and, in addition to two resistors 11, 15 and an antenna unit 16, which takes the form of a coil and is connected between the two resistors 11, 15 and is connected to a capacitive unit (=capacitor 13), is equipped with a microcontroller unit 12 and an analog interface unit 14, which is connected to the microcontroller unit 12.

On the one hand, the antenna unit 16 supplies the transponder station 40 inductively with power 20, i.e. the transponder station 40 is fed via an inductive field; on the other, in the active state (see FIGS. 2 and 3) of the transponder station 40, a communication sequence for authentication and identification between the base station 10 and the transponder station 40 takes place, to which end data signals 22, 24 are exchanged between the base station 10 and the transponder station 40; not only can the utilization and/or access entitlement for the motor vehicle be determined by means of these data signals 22, 24, but also the base station 10 can be controlled accordingly.

In detail, there exist as signal transmission links between the base station 10 and the transponder station 40 both an up-link frame 22, which, for example, takes the form of at least one LF (Low Frequency) channel with inductive coupling and is transmitted via the signals from the base station 10 to the transponder station 40, and a down-link frame 24, which, for example, takes the form of at least one LF (Low Frequency) channel and is transmitted via the signals from the transponder station 40 to the base station 10.

Following actuation of, for example, the ignition key of the motor vehicle, the base station 10 associated functionally and spatially with the motor vehicle starts to generate a signal known as a "Challenge", which is transmitted via the up-link frame 22 to the transponder station 40. Subsequently, an electronic circuit configuration 42, which is preferably equipped with at least one microprocessor, in the transponder station 40 calculates a signal train known as a "Response". This response signal is then transmitted from the transponder station 40 via the down-link frame 24 to the base station 10. This data exchange forms a central part of an authentication procedure, which is arbitrary in principle.

Only if, during the authentication or identification, the transponder station 40 is recognized as valid, generally using cryptographic methods, will the engine of the motor vehicle be started in the embodiment example described.

In order to guarantee the desired, preferably stable resonant frequency of the LC resonant circuit 13, 16 under all conditions and in all situations, the method in accordance with the invention, as explained below with reference to the two embodiment examples of FIGS. 2 and 3, uses simple means to undertake a calibration of the LC resonant circuit 13, 16. To this end, a calibration or regulation of the resonant frequency of the LC resonant circuit 13, 16 is undertaken with the aid of one single, precise reference frequency and by means of a few additional components during the running time of the system.

As can be seen is FIGS. 2 and 3, the LC resonant circuit 13, 16 may be tuned to the desired resonant frequency using an additional RC tuning circuit 17, 18, equipped with:

a first element 17 in the form of a capacitive unit (see FIG. 2) or an inductive unit (sec FIG. 3)

a regulating resistor 18, series-connected to the first element 17.

A frequency derived from the clock of the microcontroller 14 may be used as the reference for this purpose. The frequency setting may be undertaken automatically via a control circuit.

In the second embodiment example as shown in FIG. 3, the base station 10, equipped with frequency measurement, may be switched, via control commands, into a mode in which the reference frequency is used for activating the LC resonant circuit 13, 16; simultaneously, the actual resonant frequency of the LC resonant circuit 13, 16 is determined, e.g. by means of phase measurement between the signal at the output terminal of the base unit 30 assigned to the first resistor 11 and the signal at the output terminal of the base unit 30 assigned to the second resistor 15.

In order to track the actual resonant frequency of the LC resonant circuit 13, 16, the value of the variably adjustable resistor 18 is varied. This is continued according to an arbitrary control algorithm, e.g. in accordance with the principle of successive approximation, until the measured resonant frequency corresponds sufficiently accurately with the reference frequency. The algorithm described may be repeated as often as desired; as a result, temperature and/or aging effects can also be compensated, which greatly increases the accuracy of the resonant frequency.

List of Reference Numbers

100 Electronic communications system
10 Base station
11 First resistor of the base unit 30
12 Microcontroller unit of the base unit 30
12a Clock output of the microcontroller 12
13 Capacitive unit of the base unit 30
14 (Analog) interface of the base unit 30
15 Second resistor of the base unit 30
16 Antenna unit of the base unit 30
17 First element in the form of at least one capacitive unit or in the form of at least one inductive unit
18 Regulating resistor
19 D[igital]/A[nalog] converter unit
20 Power
22 Up-link frame, e.g. in the form of an LF (Low Frequency) channel
24 Down-link frame, e.g. in the form of an LF (Low Frequency) channel
30 Base unit, in particular a transponder communications device
40 Transponder station
42 Circuit configuration of the transponder station 40
44 Antenna unit of the transponder station 40

The invention claimed is:

1. An electronic communications system, equipped with
at least one base station, to which
at least one LC resonant circuit
with at least one antenna unit in the form of a coil, and
at least one capacitive unit series-connected to the antenna unit
is assigned, which base station is arranged, in particular, on an object to be secured against unauthorized use and/or against unauthorized access, such as on a means of locomotion, on an access system or on an entry system, and
at least one transponder station, to which
at least one antenna unit in the form of a coil is assigned, which transponder station can be carried by, in particular, an authorized user and/or is designed for the exchanging of data signals with the base station, wherein the utilization and/or access entitlement is determined and/or the base station can be controlled accordingly by means of these data signals,
characterized in that
connected in parallel with the antenna unit and/or in parallel with the capacitive unit is at least one tuning circuit, equipped with
at least one first element in the form of at least one capacitive unit or in the form of at least one inductive unit, and
at least one regulating resistor, series-connected to the first element, the variable resistance value of which regulating resistor can be controlled in order to set and/or to calibrate the resonant frequency of the LC resonant circuit.

2. A communications system as claimed in claim 1,
characterized in that at least a first resistor is series-connected to the capacitive unit and to the antenna unit, and/or
that at least a second resistor is connected between the antenna unit and the capacitive unit.

3. A transponder station for an electronic communications system, which electronic communications system comprises:
at least one base station, to which
at least one LC resonant circuit
with at least one antenna unit in the form of a coil, and
at least one capacitive unit series-connected to the antenna unit is assigned, which base station is arranged, in particular, on an object to be secured against unauthorized use and/or against unauthorized access, such as on a means of locomotion, on an access system or on an entry system, and
at least one transponder station, to which
at least one antenna unit in the form of a coil is assigned, which transponder station can be carried by, in particular, an authorized user and/or is designed for the exchanging of data signals with the base station wherein the utilization and/or access entitlement is determined and/or the base station can be controlled accordingly by means of these data signals, where connected in parallel with the antenna unit and/or in parallel with the capacitive unit is at least one tuning circuit, equipped with at least one first element in the form of at least one capacitive unit or in the form of at least one inductive unit, and at least one regulating resistor, series-connected to the first element, the variable resistance value of which regulating resistor can be controlled in order to set and/or to calibrate the resonant frequency of the LC resonant circuit, characterized by at least one electrical or electronic circuit configuration connected to the antenna unit.

4. A transponder station as claimed in claim 3, characterized by at least a first resistor being series-connected to the capacitive unit and to the antenna unit and/or at least a second resistor being connected between the antenna unit and the capacitive unit.

5. A base unit, in particular a transponder communications device, for an electronic communications system, which comprises:

at least one base station, which is assigned to at least one LC resonant circuit with at least one antenna unit in the form of a coil and at least one capacitive unit series-connected to the antenna unit which base station is arranged, in particular, on an object to be secured against unauthorized use and/or against unauthorized access, such as on a means of locomotion, on an access system or on an entry system, and at least one transponder station, to which at least one antenna unit in the form of a coil is assigned, which transponder station can be carried by, in particular, an authorized user and/or is designed for the extension of data signals with the base station, within the utilization and/or access entitlement is determined and/ or the base station can be controlled accordingly by means of these data signals, wherein at least one tuning circuit is connected in parallel with the antenna unit and/or in parallel with the capacitive unit, wherein the at least one tuning circuit comprises:

at least a first element in the form of at least one capacitive unit or in the form of at least one inductive unit, and at least one regulating resistor, series-connected to the first element, the variable resistance value of which regulating resistor can be controlled in order to set and/or to calibrate the resonant frequency of the LC resonant circuit, characterized by at least one base station, at least one microcontroller unit connected to the base station and/or at least one (analog) interface connected to the microcontroller unit.

6. A transponder station as claimed in claim 3, characterized by at least one D[igital]/A[nalog] converter unit being connected between at least one clock output of the microcontroller unit and the regulating resistor.

7. A method of operating at least one electronic communications system in which data signals are exchanged between at least one antenna unit, in the form of a coil, of at least one LC resonant circuit assigned to at least one base station, and at least one antenna unit, in the form of a coil, of at least one transponder station, wherein the base station is arranged, in particular, on an object to be secured against unauthorized use and/or against unauthorized access, such as on a means of locomotion, on an access system or on an entry system, and wherein the utilization and/or access entitlement is determined and/or the base station is controlled accordingly by means of these data signals, characterized by the resonant frequency of the LC resonant circuit being set to a predetermined desired value, and/or calibrated, by means of at least one tuning circuit connected in parallel with the antenna unit and/or in parallel with the capacitive unit.

8. A method as claimed in claim 7, characterized in that, in order to set and/or to calibrate the resonant frequency of the LC resonant circuit, the variable resistance value of at least one regulating resistor of the tuning circuit is regulated.

9. A regulating method for setting and/or calibrating the resonant frequency of at least one LC resonant circuit which is assigned to at least one electronic communications system as claimed in claim 1, in particular to at least one base unit as claimed in claim 5.

10. A use of at least one electronic communications system as claimed in claim 1, in particular of at least one base unit as claimed in claim 3 and/or in particular of at least one transponder station as claimed in claim 3 for authentication and/ or identification purposes and/or to check the entitlement to use, to enter or similar any object to be secured by the communications system, such as a means of locomotion, an access system or an entry system.

11. A base unit as claimed in claim 5, characterized by at least a first resistor being series-connected to the capacitive unit and the antenna unit and/or at least a second resistor being connected between the antenna unit and the capacitive unit.

12. A communications system as claimed in claim 1 with a base unit as claimed in claim 5, characterized by at least one D[igital]/A[nalog] converter unit being connected between at least one clock output of the microcontroller unit and the regulating resistor.

* * * * *